C. H. TAYLOR AND B. B. NEUTEBOOM.
TRANSMISSION GEAR.
APPLICATION FILED MAR. 1, 1919.

1,433,575.

Patented Oct. 31, 1922.

INVENTORS
CECIL HAMELIN TAYLOR.
BOUDEWIJN B. NEUTEBOOM.

BY
Ralgemoid A. Parker
THEIR ATTORNEY.

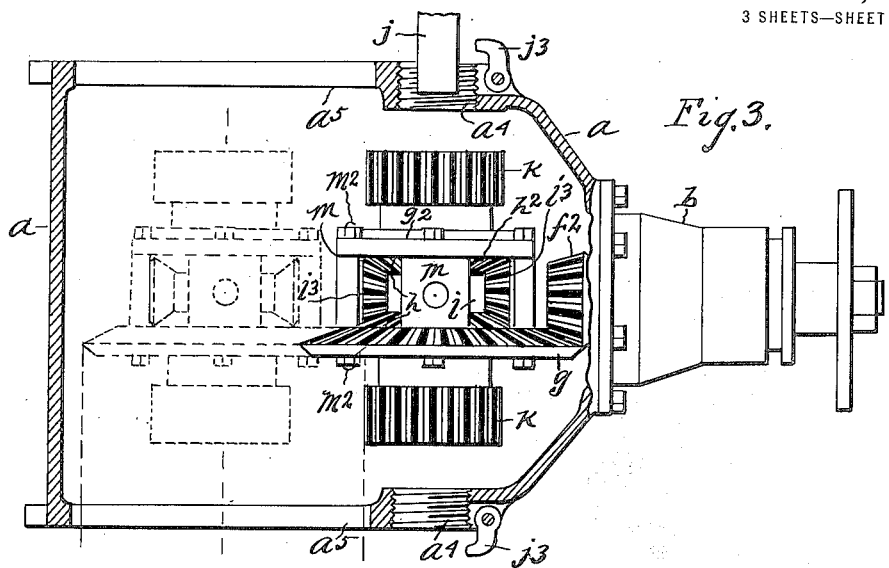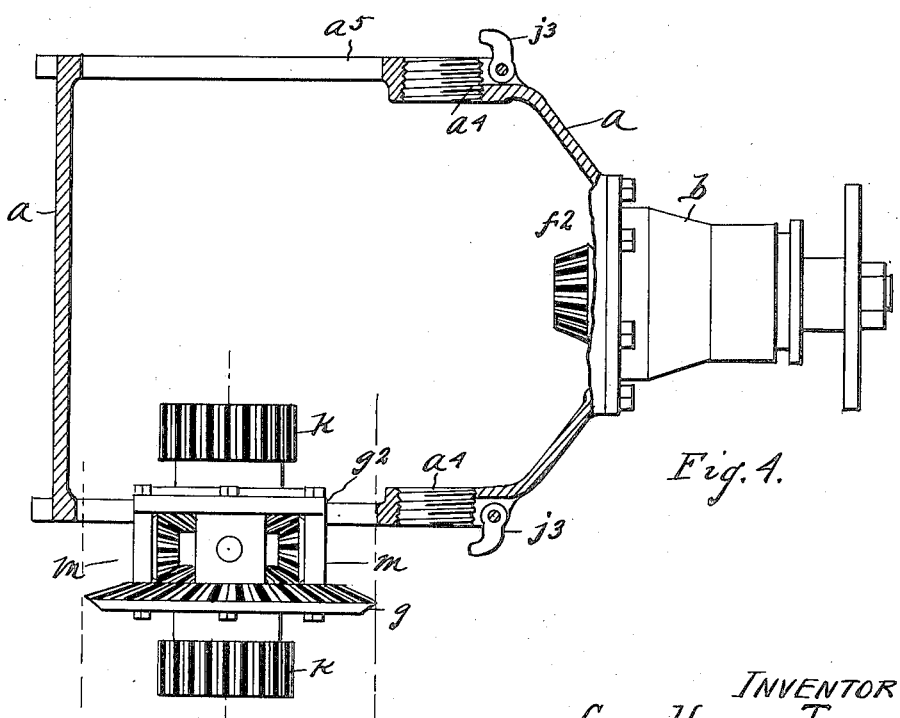

Patented Oct. 31, 1922.

1,433,575

UNITED STATES PATENT OFFICE.

CECIL HAMELIN TAYLOR AND BOUDEWIJN B. NEUTEBOOM, OF DETROIT, MICHIGAN.

TRANSMISSION GEAR.

Application filed March 1, 1919. Serial No. 280,136.

*To all whom it may concern:*

Be it known that we, CECIL HAMELIN TAYLOR, a citizen of the United States, residing at Detroit, county of Wayne, State of Michigan, and BOUDEWIJN B. NEUTEBOOM, a subject of the Queen of the Netherlands, residing at Detroit, county of Wayne, and State of Michigan, have invented a certain new and useful Improvement in Transmission Gears, and declare the following to be a full, clear, and exact description of the same, such as will enable others skilled in the art to which it pertains to make and use the same, reference being had to the accompanying drawings, which form a part of this specification.

Our invention relates to transmission gears for automobiles and an object of our improvements is to provide an improved transmission gear and one that may be easily and cheaply manufactured and assembled and disassembled.

We secure this object in the device illustrated in the accompanying drawings in which:

Figure 3 is a plan view with the casing in section and some of the parts removed and illustrating the method of removing the other parts.

Figure 4 is a view similar to Fig. 3 illustrating the method of removing some of the parts from the casing.

Figure 2:
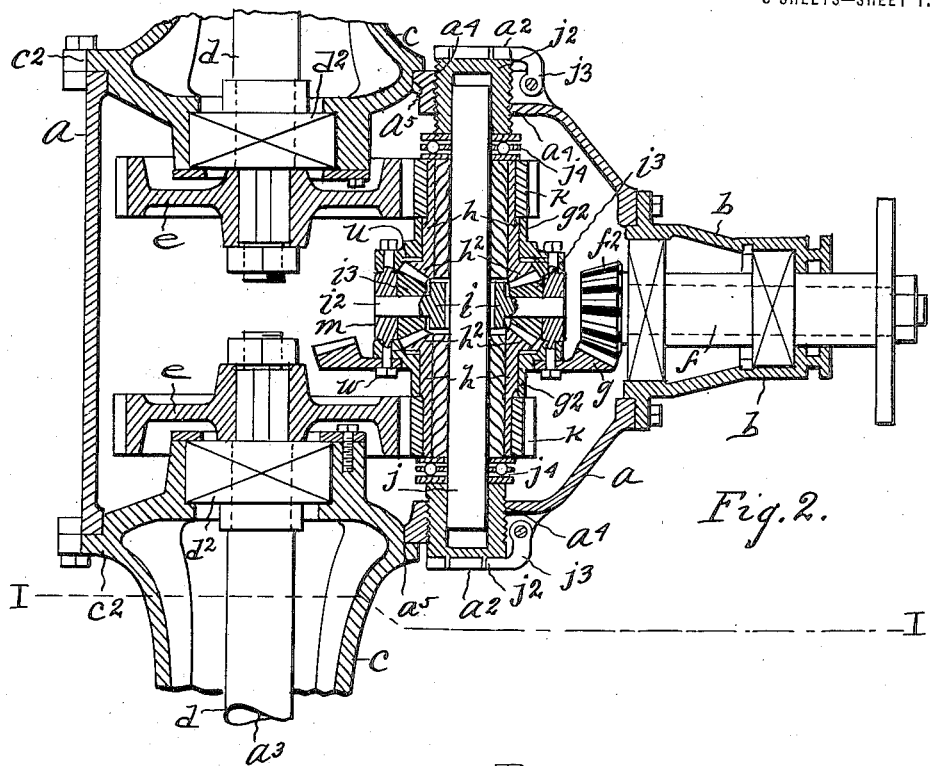
Figure 2 is a sectional plan view, the section being taken on the line II—II Fig. 1.
Figure 1:
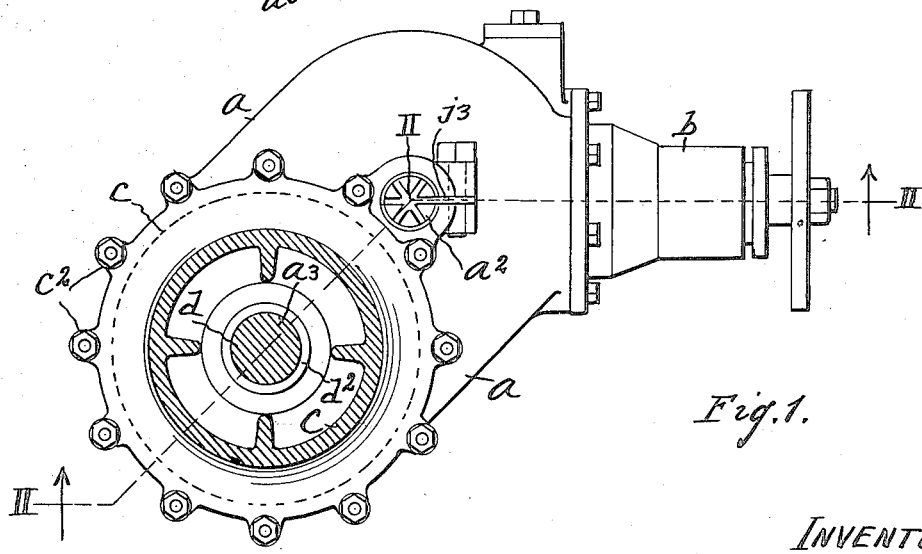
Figure 1 is a side view partly in section on the line I—I Fig. 2.
Figure 5:
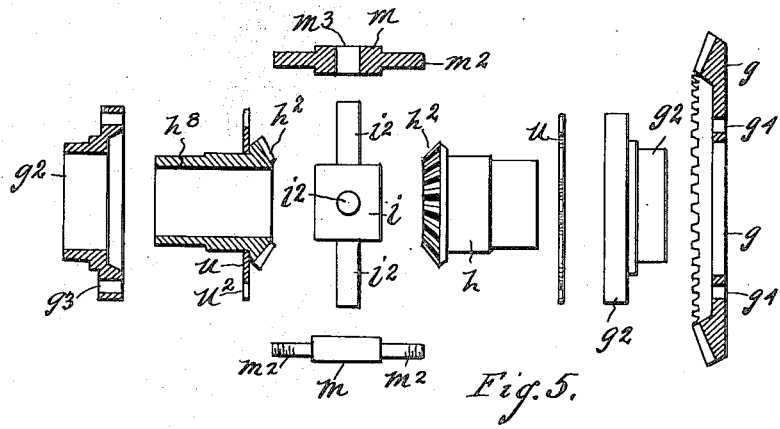
Figure 5 is a view of parts of the differential, the same being separated the one from the other and shown in position for assembling.
Figure 6:
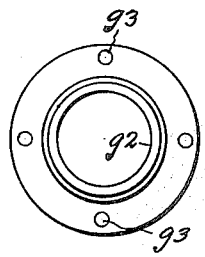
Figure 6 is an end view of one of the carrying disks of the differential.
Figure 7:
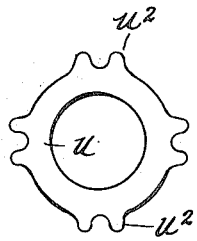
Figure 7 is a plan view of one of the friction washers.
Figure 8:
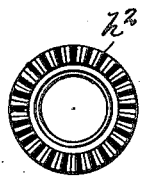

Figure 8 is an end view of one of the driven gears of the differential.

Figure 9:
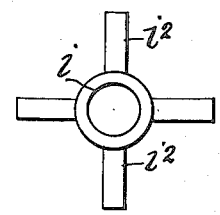

Figure 9 is an elevation of the spider of the differential.

Figure 10:
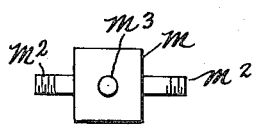
Figure 11:
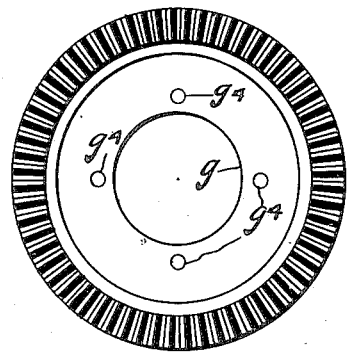

Figure 10 is a plan view of the same.
Figure 11 is the main wheel upon the differential which receives the power from the transmission shaft.

$a$ is the gear case having the two shaft-centers $a^2$ $a^2$ and $a^3$ $a^3$ preferably in the relative position shown, that is to say, the shaft-center $a^3$ $a^3$ is below and back of $a^2$ $a^2$. $b$ is the casing for the bearing of the transmission shaft. $c$ $c$ are the casings for the two parts of the divided axle. $d$ $d$ are the two axle parts. $e$ $e$ are spur gear wheels upon the ends of the shaft sections $d$ $d$. $f$ is the transmission shaft having a conical gear wheel $f^2$ upon its inner end.

$j$ is a short shaft having its axis in the line of the shaft centers $a^2$ $a^2$. $j^2$ $j^2$ are cap pieces having exterior screw threads adapted to engage screw-threads in the apertures $a^4$ $a^4$ in the wall of the casing $a$. These cap pieces have bearings for the ends of the shaft $j$. $h^2$ $h^2$ are bevel gear wheels having elongated hubs $h$ which rest by means of roller bearings upon the shaft $j$ and are adapted to rotate around said shaft on said bearings. $g^2$ $g^2$ are annular plates provided with hubs bearing upon the hubs $h$ $h$ of the gear wheels $h^2$ $h^2$. $u$ $u$ are friction plates interposed between the face of the gear wheels $h^2$ $h^2$ and the face of the plate $g^2$. $i$ is a spider adapted to turn around the center of the shaft $j$ between the gear wheels $h^2$ $h^2$ and having four radially extending arbors $i^2$. There are four plates $m$ having apertures at their centers adapted to fit over the arbors $i^2$ and having oppositely extending screw threaded shanks $m^2$ which engage in apertures through the plates $g^2$ $g^2$ at the peripheries of the same. The plates $g^2$ $g^2$ are thus secured together by nuts on the outside of the screw threaded shanks $m^2$ pressing said plates against the enlarged center portion of the plates $m$. There are the usual planetary gear wheels $i^3$ pivoted upon the arbors $i^2$ inside of the plates $m$ between the plates $g^2$ $g^2$, their teeth engaging the gear wheels $h^2$ $h^2$. $g$ is an annular bevel gear wheel secured to one of the plates $g^2$ so as to be engaged by the gear wheel $f^2$ to be driven thereby in the usual way. $j^4$ $j^4$ are thrust bearings interposed between the outer ends of the hubs $h$ of the gear wheels $h^2$ and the caps $j^2$. Said caps are screwed up against said thrust bearing to secure the right position and adjustment and their outer faces are provided with slots in which engage dogs $j^3$ to prevent rotation and accidental displacement of said caps. $k$ $k$ are spur gear wheels keyed upon the outer ends of the hubs $h$ $h$ of the gear wheels $h^2$ $h^2$. The wheels $e$ $e$ keyed on the inner ends of the shaft sections $d$ $d$ mesh with the wheels $k$ $k$.

The parts as above described may be disassembled as follows: The bolts through the flanges $c^2$ of the axle casing $c$ $c$ are removed and the casings with their contained sections assembled therein may be removed as a unit, the wheel $e$ being drawn through the aperture $a^5$. A cap $j^2$ may then be screwed out of an aperture $a^4$ and the shaft $j$ be withdrawn in an axial direction as illustrated in Fig. 3. This permits the assembled differential mechanism to be lowered down as a unit and drawn through one of the plates $a^5$ as indicated in Fig. 4, so of course the differential mechanism may be assembled as a unit outside, passed into the casing with its axis in the line of axes $a^2$ $a^2$ and the shaft $j$ inserted through an opening $a^4$ and secured in place by adjusting the cap bearings $j^2$.

What we claim is:

1. In an apparatus of the kind described, a casing, a differential mechanism provided with two driving wheels on opposite sides of the relatively movable parts of said gearing, said differential mechanism being a unitary construction and having an axial opening therethrough coaxial with said gear wheels, and a shaft adapted to be inserted and withdrawn from said axial opening, the construction being such as to permit the withdrawal of said axle longitudinally from said casing, said casing being provided with an opening adapted to permit the passage of said differential mechanism as a unit.

2. In an apparatus of the kind described, a gear casing, a sectional shaft having casings for each of the sections thereof, an opening in said first named casing adapted to receive the ends of the casings for the sections of the shaft, said sectional casings being adapted to have their ends secured to the first named casing, spur gear wheels on the end of the axle sections within said first named casing, a differential mechanism having two spur gears upon opposite sides of the relatively movable parts thereof engaging the spur gears on the ends of said axle sections, said differential mechanism having an opening through it axially and through the axis of said spur gears and a shaft or arbor extending through the axial opening in said differential mechanism and longitudinally removable therefrom, the differential mechanism and the spur gears forming a part thereof being adapted to turn on said shaft or arbor as a bearing.

3. In an apparatus of the kind described, a gear casing, a sectional shaft and casings for the sections of said shaft, said first mentioned casing being provided with an opening adapted to receive the end of a sectional axle casing, a differential mechanism having an axial opening therethrough, a shaft adapted to bear on said first mentioned casing extending through the axial opening of said differential mechanism and forming a bearing therefor, said shaft being removable from said differential mechanism and said mechanism being removable through the opening provided for the end of the sectional axle casing.

4. In a differential, the combination of two carrying plates, a spider having a radial arbor, a plate having a central aperture adapted to fit over the end of said arbor, and means for securing the last named plate to said carrying plates to secure the latter firmly together.

5. In a differential, the combination of two carrying plates, a spider having a radial arbor, a plate having a central aperture adapted to fit over the end of said arbor, means for securing the last named plate to said carrying plate to secure the latter firmly together, and a conical gear wheel having a tubular hub adapted to fit in each of said carrying plates.

In testimony whereof, we sign this specification.

CECIL HAMELIN TAYLOR.
BOUDEWIJN B. NEUTEBOOM.